(12) United States Patent
Inoue et al.

(10) Patent No.: US 8,808,123 B2
(45) Date of Patent: Aug. 19, 2014

(54) FRONT DERAILLEUR WITH FRAME SUPPORT STRUCTURE

(75) Inventors: Kenkichi Inoue, Sakai (JP); Atsuhiro Emura, Sakai (JP); Kazuya Kuwayama, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 319 days.

(21) Appl. No.: 13/250,827

(22) Filed: Sep. 30, 2011

(65) Prior Publication Data

US 2013/0085024 A1    Apr. 4, 2013

(51) Int. Cl.
*F16H 59/00* (2006.01)
*B62M 9/136* (2010.01)
*B62M 9/134* (2010.01)

(52) U.S. Cl.
CPC ............... *B62M 9/134* (2013.01); *B62M 9/136* (2013.01)
USPC .............................................. 474/80; 474/82

(58) Field of Classification Search
USPC ............ 474/78–83, 109–111; 280/238, 288.4
See application file for complete search history.

(56) References Cited

U.S. PATENT DOCUMENTS

| 2,358,575 | A | * | 9/1944 | Hurley | 24/278 |
| 2,392,210 | A | * | 1/1946 | Zaleske | 24/278 |
| 2,590,975 | A | * | 4/1952 | Juy | 474/80 |
| 4,199,997 | A |   | 4/1980 | Isobe | |
| 4,486,182 | A | * | 12/1984 | Coue | 474/80 |
| 4,675,952 | A | * | 6/1987 | Nagano | 24/483 |
| 4,998,652 | A | * | 3/1991 | Champagne | 224/414 |
| 5,366,418 | A | * | 11/1994 | Fukushima et al. | 474/111 |
| 6,270,124 | B1 | * | 8/2001 | Nanko | 285/15 |
| 7,722,487 | B2 | * | 5/2010 | Ichida et al. | 474/80 |
| 7,779,724 | B2 | * | 8/2010 | Fujii | 74/551.8 |
| 2004/0185975 | A1 |   | 9/2004 | Chen | |
| 2004/0259672 | A1 | * | 12/2004 | Betz | 474/101 |
| 2005/0143206 | A1 | * | 6/2005 | Tetsuka et al. | 474/80 |
| 2007/0117666 | A1 |   | 5/2007 | Ichida | |

FOREIGN PATENT DOCUMENTS

| EP | 1787902 A2 | 5/2007 |
| EP | 2520480 A1 | 11/2012 |

OTHER PUBLICATIONS

Extended European Search Report issued by the European Patent Office on Jan. 17, 2013, in related European application.

* cited by examiner

*Primary Examiner* — William E Dondero
*Assistant Examiner* — Minh Truong
(74) *Attorney, Agent, or Firm* — Brennan C. Swain, Esq.; Jeffer Magels Butler & Mitchell LLP

(57) ABSTRACT

A bicycle front derailleur that includes a chain guide configured to engage a bicycle chain and a mounting member operatively coupled to the chain guide. The mounting member includes a frame support structure that includes a contact member that is configured to contact the frame of the bicycle, and a support member mounted to the mounting member. The contact member is supported by the support member.

12 Claims, 6 Drawing Sheets

FRONT DERAILLEUR WITH FRAME SUPPORT STRUCTURE

FIELD OF THE INVENTION

The present invention relates to a front derailleur for a bicycle that includes a frame support structure.

BACKGROUND OF THE INVENTION

A bicycle front derailleur is sometimes attached to the seat tube of a bicycle frame by a mounting fixture, which is fastened to the seat tube of the frame by welding, threaded fasteners or the like. This mounting fixture is sometimes called a direct-mounting seat or braze-on seat. Since such mounting fixtures are fastened to the seat tube beforehand, the chain guide of the derailleur cannot be disposed in a parallel position directly above the front sprocket in the case of systems in which a band is formed as an integral part of the front derailleur, unless the orientation is adjusted about an axis parallel to the seat tube following mounting.

US 2007/0117666A1, which is incorporated by reference in its entirety herein, teaches a bicycle front derailleur which is capable of adjustment. However, a need exists for an improved front derailleur with adjustment capabilities. The present invention relates to a front derailleur which is fastened to a bicycle frame and which can be attached to a mounting fixture having a circular arcuate surface so that fine adjustments can be made by rotation about a first axis.

SUMMARY OF THE PREFERRED EMBODIMENTS

In accordance with a first aspect of the present invention there is provided a bicycle front derailleur that includes a chain guide configured to engage a bicycle chain and a mounting member operatively coupled to the chain guide. The mounting member includes a frame support structure that includes a contact member that is configured to contact the frame of the bicycle, and a support member mounted to the mounting member. The contact member is supported by the support member.

In a preferred embodiment, the contact member is movably connected to the support member. In a preferred embodiment, the contact member includes a support plate and a resilient cover that covers the support plate and the resilient cover is movably connected to the support member. The resilient cover includes a recess for receiving the support member. In a preferred embodiment, the support member includes an end portion that has a semi-globular shape that is received in the recess of the resilient cover. In a preferred embodiment, the support member extends through an opening defined in the mounting member and the support member is movable with respect to the mounting member and within the opening. In a preferred embodiment, the contact member has an arcuate shape and when the derailleur is mounted on a seat tube of a bicycle, the contact member has a different diameter than the seat tube.

The invention, together with additional features and advantages thereof, may be best understood by reference to the following description.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Figure 2:
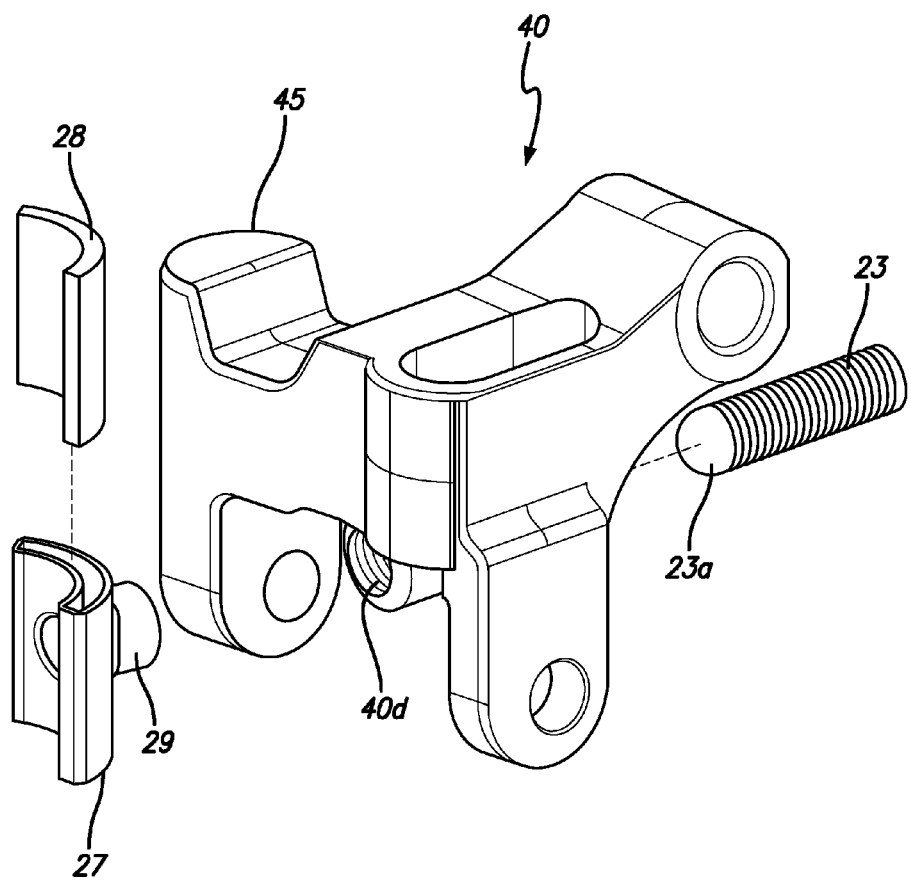
FIG. 2 is an exploded view of the mounting member and frame support structure of the bicycle front derailleur of FIG. 1.
Figure 3:
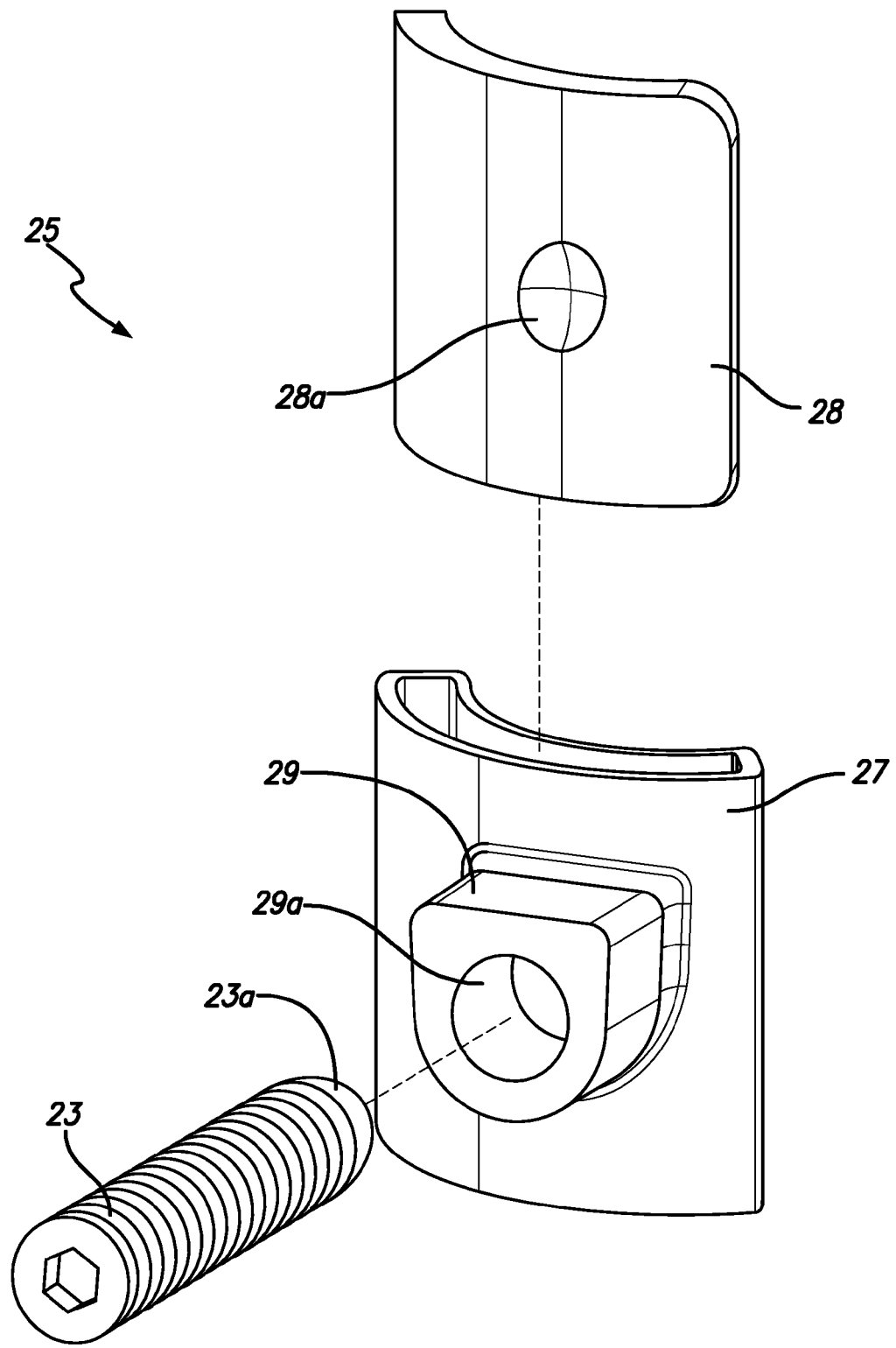
FIG. 3 is an exploded view of the frame support structure of the bicycle front derailleur of FIG. 1.
Figure 4:
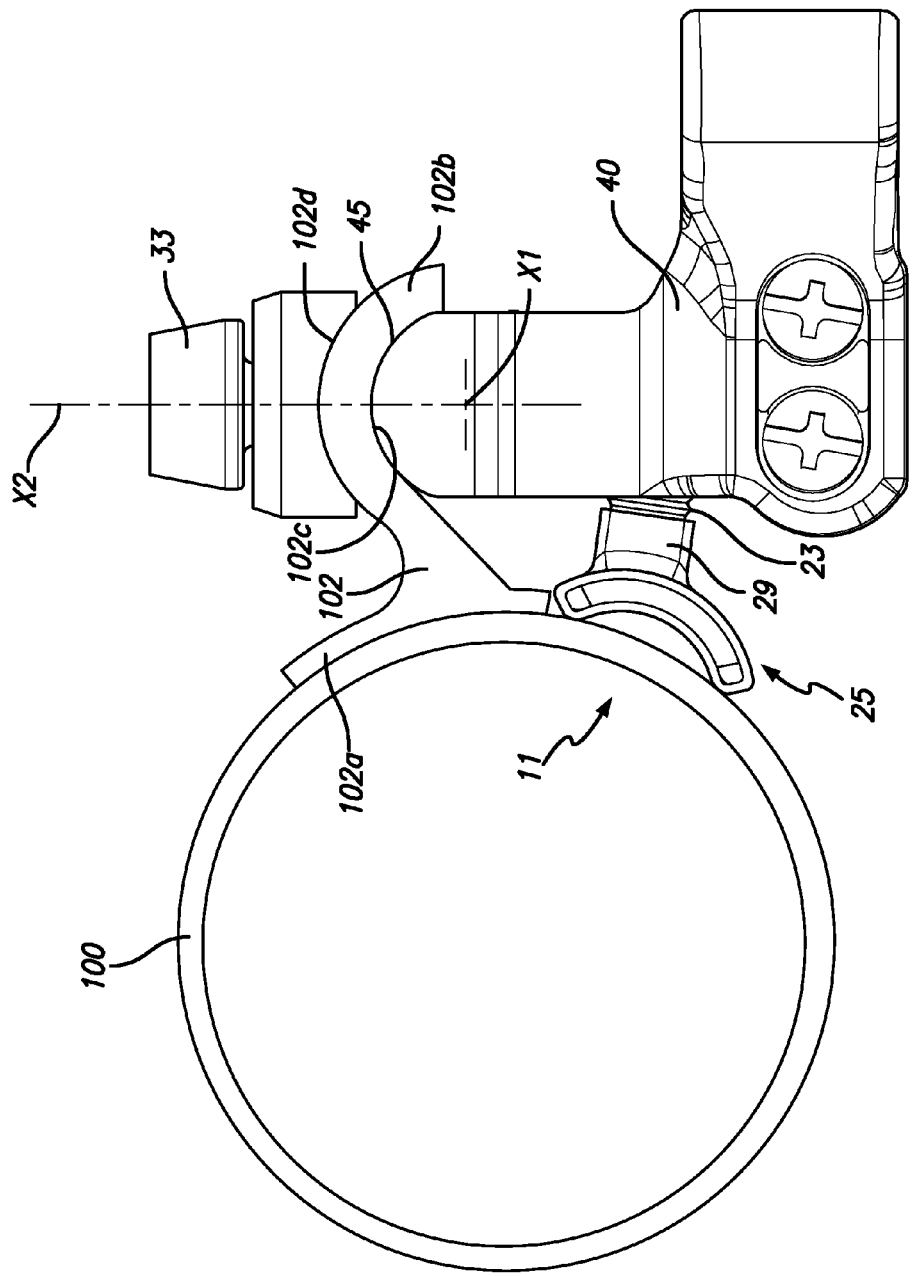
FIG. 4 is a top plan view of the frame support structure and mounting member of the bicycle front derailleur of FIG. 1.
Figure 5:
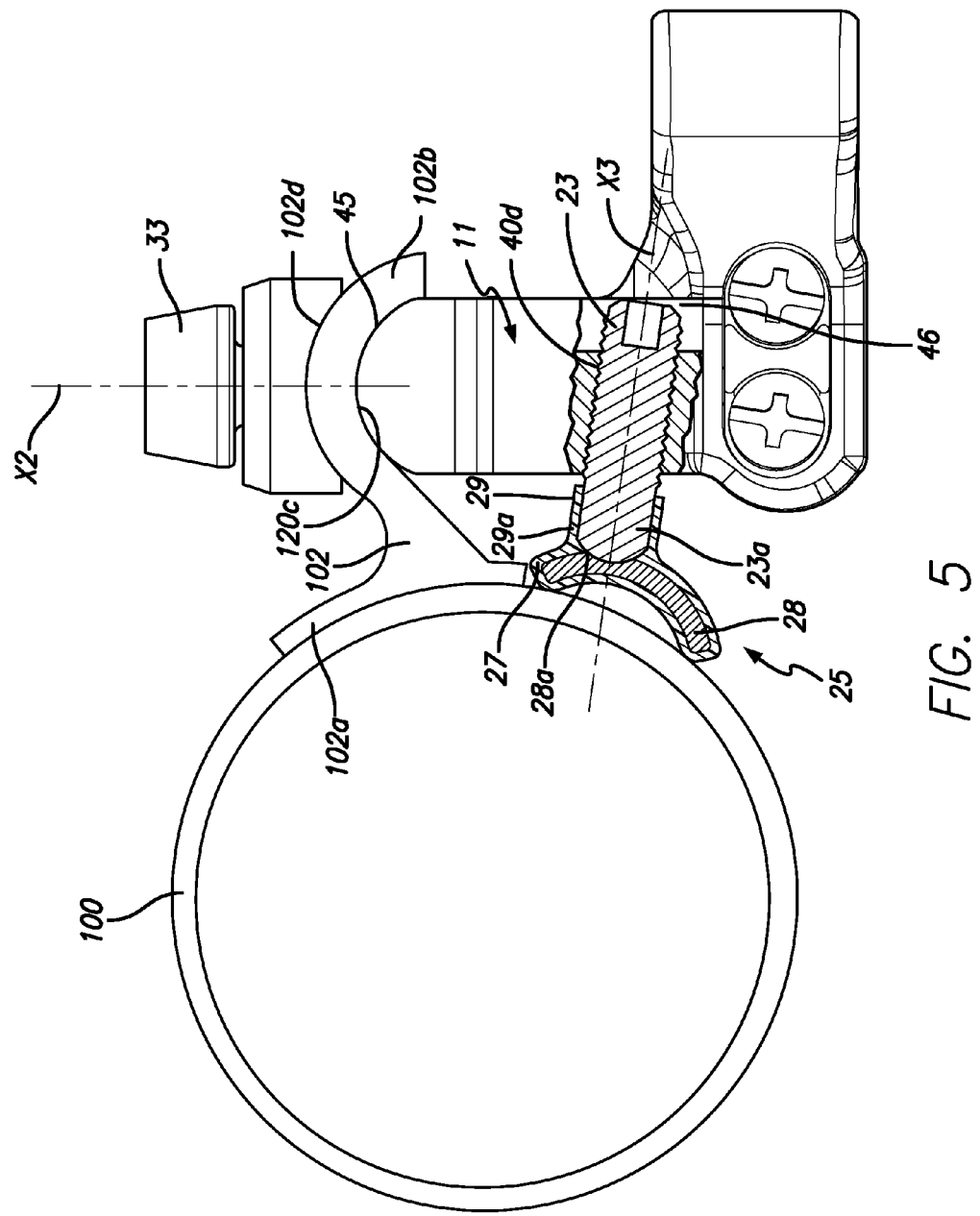
FIG. 5 is a top plan view of the frame support structure and mounting member of the bicycle front derailleur of FIG. 1 with a portion cut away to show the support member.
Figure 6:
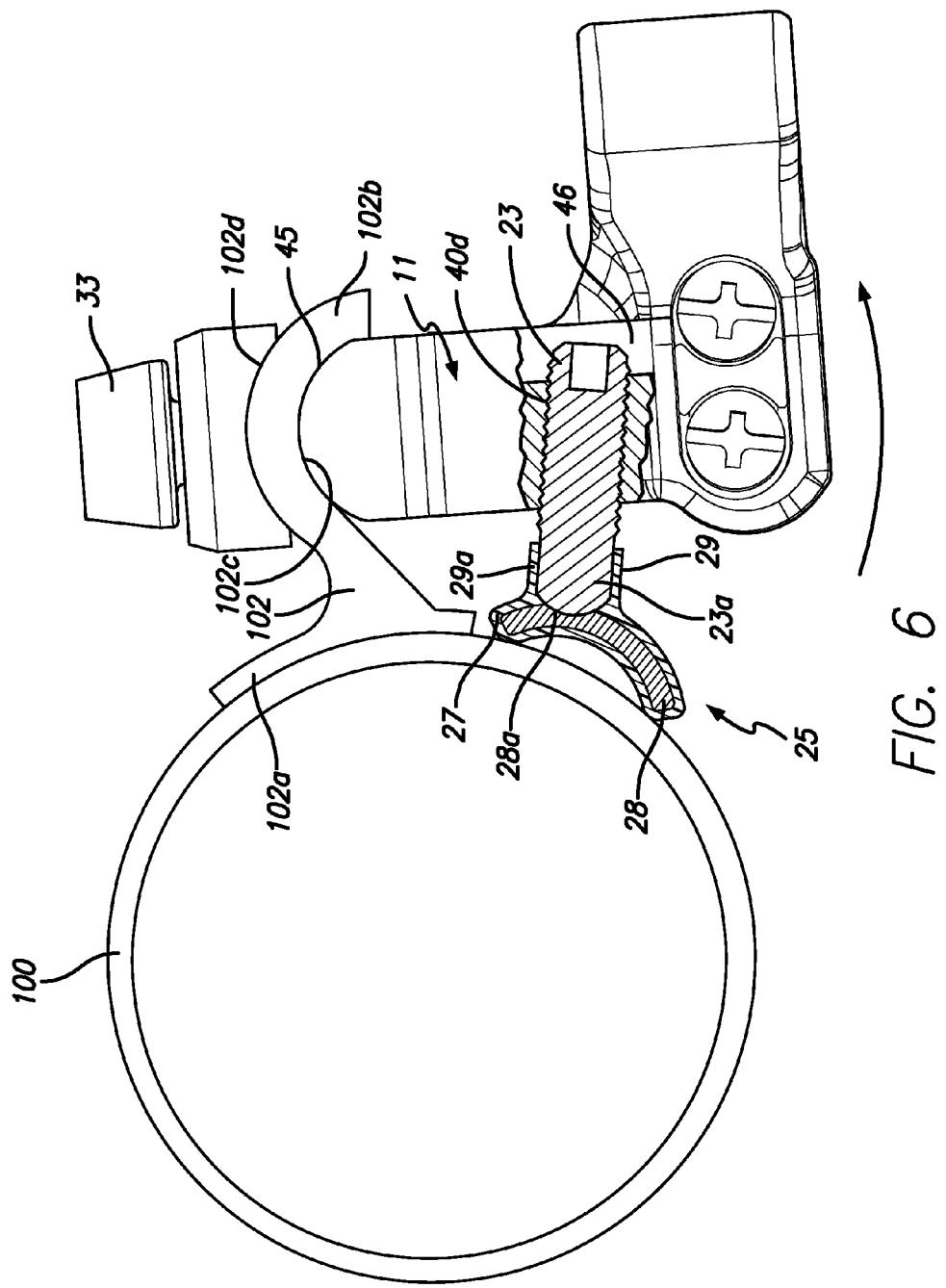
FIG. 6 is another top plan view of the frame support structure and mounting member of the bicycle front derailleur of FIG. 1 with a portion cut away to show the support member after adjustment.

Referring now to the drawings, which are for purposes of illustrating the present invention and not for purposes of limiting the same, FIGS. 1-6 show a front derailleur 10 for a bicycle. In a preferred embodiment, as shown in FIGS. 4-6, the front derailleur 10 is mounted on the seat tube 100 of a bicycle. However, this is not a limitation on the present invention, and the front derailleur can be affixed to or mounted on other parts of a bicycle.

Figure 1:
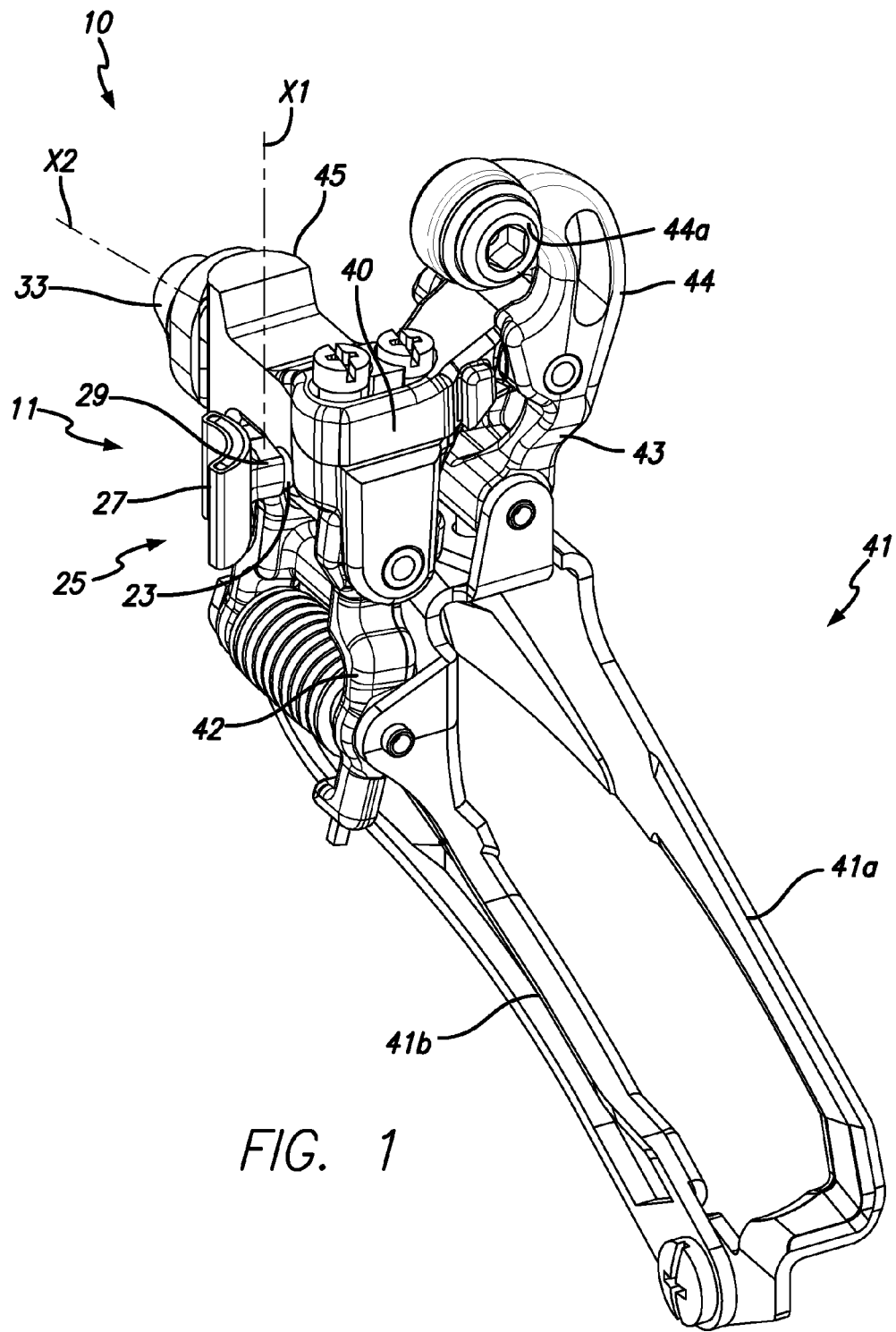
FIG. 1 is a perspective view of a bicycle front derailleur with a frame support structure in accordance with a first preferred embodiment of the present invention.

As shown in FIG. 1 the front derailleur 10 is a downswing-type derailleur. The front derailleur 10 preferably includes the main body or mounting member 40, a chain guide 41, an inner link 42 and an outer link 43. The mounting member 40 is mounted on the seat tube 100 and the chain guide 41 is configured to move between a retracted position and an extended position relative to the mounting member 40. It will be understood that in FIGS. 2-6, the chain guide 41, inner and outer links 42 and 43 and associated components have been omitted for ease of viewing of the remaining components.

As shown in FIG. 4 the front derailleur 10 is mounted to the seat tube 100 using a mounting fixture 102 of the bicycle frame (not shown) to support the front derailleur 10 in a desired angular orientation. The mounting fixture 102 is fastened to the seat tube 100 by fastening means such as welding, fastener (bolt) or the like. The mounting fixture 102 has a bicycle frame fastening part 102a that can be fastened to the seat tube 100, a front derailleur mounting part 102b that is disposed on the bicycle frame fastening part 102a and that secures or fastens the front derailleur 10 in place.

The front derailleur mounting part 102b secures the front derailleur 10 in position so that adjustment is possible about a first adjustment axis X1, which is generally parallel to the seat tube 100 and is disposed at a distance from the seat tube 100. The front derailleur mounting part 102b is formed by bending a long plate-form member in the vertical direction about the first adjustment axis X1 and includes circular arcuate surfaces 102c and 102d that are centered substantially on the first adjustment axis X1. Moreover, a slot (not shown) which is used to fasten the front derailleur 10 so that adjustment is possible in the vertical direction is formed in the front derailleur mounting part 102b. The slot allows a first fastening bolt 33, which is used to fasten the front derailleur 10, to pass through from a first fastening direction that runs along a second mounting axis X2 orthogonal to the first adjustment axis X1. The width of the slot is a dimension that is considerably larger than the external diameter of the first fastening bolt 33, so that the first fastening bolt 33 can pass through at an inclination. In another embodiment, the slot can be omitted and replaced by a circular opening, thus eliminating adjustment in the vertical direction.

The bicycle frame fastening part 102a has a size that allows mounting on the outer circumferential surface equal to approximately a quarter circle of the seat tube 100. The circumference of the bicycle frame fastening part 102a is welded to the seat tube 100. In the case of such a construction, the position of the mounting fixture 102 cannot be later adjusted and the orientation of the front derailleur 10 is therefore adjusted by the front derailleur mounting part 102b.

The mounting member 40 of the front derailleur 10 is secured to the mounting fixture 102, while the chain guide 41 is free to move in the gear shift direction toward or away from the mounting member 40 via the inner and outer links 42 and 43 which are disposed generally parallel to each other and rotatably connect the mounting member 40 and the chain guide 41.

The fixing part 45 of the mounting member 40 is formed in a generally semi-circular arcuate shape as seen in a plan view (such as FIG. 4) so as to conform to the circular arcuate surface 102c of the front derailleur mounting part 102b. A screw hole (not shown) is formed in the fixing part of the mounting member 40 for threadedly receiving the first fastening bolt 33.

The chain guide 41 guides the chain (not shown) to either of the at least two front chain rings (not shown) by moving corresponding shift positions that include a low shift position disposed over the small diameter or inside chain ring, and a top shift position disposed over the large diameter or outside chain ring. The chain guide 41 is connected to the outer ends of the inner link 42 and the outer link 43 so as to move between the retracted position and the extended position relative to the mounting member 40. The inner link 42 and the outer link 43 are pivotally coupled at their inner ends to the mounting member 40 and pivotally coupled at their outer ends to the chain guide 41. The inner link 42 and the outer link 43 are arranged so as to be generally parallel to each other. Thus, the inner and outer links 42 and 43 form a four bar linkage assembly with the mounting member 40 and the chain guide 41 in order to move the chain guide 41 between the retracted position and the extended position. In the present embodiment, the chain guide 41 has an outer plate 41a and an inner plate 41b that define a chain receiving slot therebetween. The outer plate 41a is disposed on the outside (the side distant from the seat tube 100), and the inner plate 41b is disposed on the inside.

As shown in FIG. 1, the inner link 42 is disposed, beneath the mounting member 40 in a state in which the mounting member 40 is mounted on the seat tube 100, and both ends of this link are connected to the mounting member 40 and chain guide 41 in a manner that allows the link to pivot freely. One end of the inner link 42 is connected to the mounting member 40 so that the inner link 42 can swing freely. The chain guide 41 is connected to the other end of the inner link 42 so that the chain guide can swing freely.

The outer link 43 is a link which is disposed generally parallel to the inner link 42 and in which both ends of the link are connected to the mounting member 40 and the chain guide 41 in positions that are more distant from the mounting member 40 than the inner link 42 is, so that outer link 43 can pivot freely. A cable anchoring arm 44 is provided on the outer link 43. A cable anchoring part 44a for bolting down the inner cable of the gear shift cable (not shown) is disposed on the extended distal end of the cable anchoring arm 44.

As shown in FIGS. 5-6, a screw hole (not shown) that is used for fastening by the first fastening bolt 33 in the direction of the axis X2 orthogonal to the first adjustment axis X1 is formed in the mounting member 40, and a screw hole 40d is formed along a third displacement axis X3 that is orthogonal to the first adjustment axis X1, but not orthogonal to the second mounting axis X2. A support member 23, that is preferably threaded with a recessed hexagonal socket is mounted in the screw hole 40d so that the support member 23 is free to advance and retract. A hexagonal recessed socket that can be turned by an Allen key is formed in the base end of the support member 23, and the distal end portion 23a has a semi-spherical or globular shape. Mounted on the distal end 23a of the support member 23 is a contact member 25 that contacts the outer circumferential surface of the seat tube 100, as shown in FIGS. 4-6.

As shown in FIGS. 2-3, in a preferred embodiment, the contact member 25 comprises a resilient support plate cover 27 that houses a support plate 28 and that includes a receiver member 29 that has a recess 29a defined therein for receiving the distal end 23a of the support member 23. In another embodiment, the contact member 25 can comprise a single resilient member. In other words, the support plate 28 can be omitted. Preferably, the support plate cover 27 and support plate 28 have an arcuate shape. As shown in FIGS. 5 and 6, in a preferred embodiment, opening 29a extends through the back surface of the support plate cover and support plate 28 includes an indentation 28a in the back surface thereof, which receives and seats the distal end 23a of the support member 23. It will be understood that, in this embodiment, the distal end portion 23a is movably supported within opening 29a and that distal end portion 23a and opening 29a (together with indentation 28) form a "ball joint" arrangement. In a preferred embodiment, the resilient support plate cover 28 is made of a resilient material, such as a resin or the like, and the support plate 28 is made of a metal. However, this is not a limitation on the present invention. As shown in FIGS. 4-6, although the arcuate shape of the contact member 25 and the components thereof (the support plate cover 27 and support plate 28) has a different diameter than that of the seat tube 100, it is preferred that the contact member and the seat tube can have a similar diameter so that the entire front surface of the contact member is flush against the seat tube.

An example of how the front derailleur 10 of the present invention can be adjusted will now be described. Initially, the first fastening bolt 33 is positioned in a lightly tightened state, so that the vertical position can be adjusted and adjustment about the first adjustment axis X1 is possible. The vertical position is then adjusted so that the gap between the addendum circle of the large-diameter sprocket and the lower edge part of the outer plate is approximately 1 to 3 mm, and the orientation about the first adjustment axis X1 is adjusted so that the outer plate is disposed in a position directly above the smaller-diameter sprocket and parallel to the smaller-diameter sprocket. When the adjustments are completed, the first fastening bolt 33 is tightened. In cases where the contact member 25 does not contact the seat tube 100, a wrench is placed in the recessed, hexagonal socket in the support member 23 via an opening in the outer link 43 and the support member 23 and contact member 25 are advanced until the contact member 25 (the resilient cover 27) comes into contact with the seat tube 100. It will be appreciated by those skilled in the art that the chain guide 41 is more stably supported by the contact member 25 when the chain guide 41 is in the extended position compared to a derailleur without the contact member 15.

As is shown in FIG. 5, the support member 23 (and the third axis X3) are arranged such that they form an angle with the second axis X2 between about 78° to about 86°. FIG. 5 also shows an access opening 46 so that a tool/wrench can be passed through the axis opening 46 to access the support member 23.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after tiling the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bicycle front derailleur comprising:
a chain guide configured to engage a bicycle chain, and
a mounting member operatively coupled to the chain guide and configured to be mounted to a mounting fixture mounted to a seat tube of a bicycle frame by a fastening bolt that defines a mounting axis, wherein the mounting member includes a frame support structure that includes a contact member directly contacting the seat tube and a support member mounted to the mounting member, wherein the support member is configured to be advanced toward the frame of the bicycle, wherein the contact member is configured to contact the bicycle frame and has a recess that receives a distal end of the support member such that the contact member is supported by the support member, wherein the support member defines a displacement axis, wherein the displacement axis is not orthogonal to the mounting axis.

2. The bicycle front derailleur of claim 1 wherein the distal end of the support member is received within the recess of the contact member to form a ball joint arrangement.

3. The bicycle front derailleur of claim 1 wherein the contact member comprises a support plate and a resilient cover that houses the support plate.

4. The bicycle front derailleur of claim 3 wherein the resilient cover is movably connected to the support member.

5. The bicycle front derailleur of claim 3 wherein the resilient cover and the support plate have an arcuate shape.

6. The bicycle front derailleur of claim 4 wherein the resilient cover includes the recess for receiving the support member.

7. The bicycle front derailleur of claim 4, wherein the resilient cover is made of a resin and the support plate is made of a metal.

8. The bicycle front derailleur of claim 6 wherein the resilient cover includes a rearwardly extending receiver member in which the recess is defined, wherein the support member includes an end portion that is received in the recess of the receiver member, and wherein the end portion has a semi-globular shape.

9. The bicycle front derailleur of claim 8 wherein the support plate has an indentation defined in a back surface thereof, and wherein the end portion of the support member is seated in the indentation.

10. The bicycle front derailleur of claim 1 wherein the support member extends through an opening defined in the mounting member, and wherein the support member is movable with respect to the mounting member and within the opening.

11. A bicycle front derailleur comprising:
a chain guide configured to engage a bicycle chain, and
a mounting member operatively coupled to the chain guide, wherein the mounting member includes a frame support structure that includes a contact member and a support member mounted to the mounting member, wherein the contact member is configured to contact an outer surface of a seat tube of the bicycle and has a frame facing surface configured to face the seat tube, the frame facing surface having an arcuate shape that defines an arc extending in a circumferential direction of the seat tube having a first radius, wherein the outer circumferential surface of the seat tube defines a second radius, wherein the first radius is smaller than the second radius such that a space is formed between the outer surface of the seat tube and at least a portion of the frame facing surface.

12. The bicycle front derailleur of claim 11 wherein the contact member has a recess that receives a distal end of:
the support member to form a ball joint arrangement.

* * * * *